United States Patent

Asai et al.

[11] Patent Number: 5,476,700
[45] Date of Patent: Dec. 19, 1995

[54] DISC BASE AND MOLD FOR MOLDING THE DISC BASE

[75] Inventors: Ikuo Asai; Toshiyuki Ebina, both of Ohbu, Japan

[73] Assignee: Kabushiki Kaisha Meiki Seisakusho, Aichi, Japan

[21] Appl. No.: 305,341

[22] Filed: Sep. 13, 1994

[30] Foreign Application Priority Data

Oct. 29, 1993 [JP] Japan .................................. 5-294049

[51] Int. Cl.$^6$ ...................................................... B32B 3/02
[52] U.S. Cl. ...................... 428/66.6; 360/133; 360/135; 428/156; 428/163; 428/167; 428/694 ST; 428/694 SG; 428/900
[58] Field of Search ................................ 428/64, 65, 900, 428/694 ST, 694 SG, 156, 163, 167; 369/275.5, 280, 291; 360/135, 133

[56] References Cited

U.S. PATENT DOCUMENTS 5,092,759  3/1992  Lichtinger et al. ...................... 425/546
5,202,171  4/1993  Anezaki ...................................... 428/65

FOREIGN PATENT DOCUMENTS 75945   4/1987  Japan .................................. 369/275.5
217582  9/1988  Japan .................................. 369/275.5

*Primary Examiner*—Nasser Ahmad
*Attorney, Agent, or Firm*—Oliff & Berridge

[57] ABSTRACT

A disc base formed concentrically in the recited order from its center opening to its outer circumferential edge with clamp areas on its two faces, a groove by a stamper holder and a signal area both leading from one of the clamp areas on its one face, and a stack rib on its other face. The diameter of the concentric circuit of the top of the stack rib is slightly larger than the diameter of the concentric circuit of the groove formed by the stamper holder, and the angle of the outer slope of the stack rib is larger than the angle of the inner slope of the same. Also disclosed is a mold for molding the disc base.

4 Claims, 8 Drawing Sheets

DISC BASE AND MOLD FOR MOLDING THE DISC BASE

BACKGROUND OF THE INVENTION

1. Field of the Invention

The present invention relates to both a recording medium disc (as will be shortly referred to as the "disc") such as a video disc or an audio disc, which is formed with a stack rib for protecting the signal face of a disc base or its face having no protecting coating from being damaged, and a mold for molding the disc.

2. Description of the Prior Art

In the case of the prior art, in which a disc base is to be formed by an injection molding, a cavity formed by both the mirror surface of a stationary mold half and a stamper fixed on the mirror surface of a movable mold half by a stamper holder is charged with a molten resin which is injected through a sprue bush.

The disc base thus molded is formed at its center with an opening. In the surface of this disc base, there are formed the helical or concentric pits which are transferred by the stamper. The disc base is formed with an annular groove inside of the signal area having the pits by the stamper holder.

The disc base thus molded is required for recording clear signals to have a low double refractive index but no difference in the double refractive index between the outer and inner circumferential portions of the disc, that is, to have a homogeneous double refractive index so that it may have no internal distortion to enjoy a homogeneous surface finish.

In order to satisfy these requirements, the molten resin has to flow smoothly in the cavity, when this cavity is to be charged with the molten resin, and the air in the cavity has to be discharged to the outside by the molten resin, so that neither the air nor the resin flow pattern may be mixed into the resin to prevent the defective molding.

Here, the disc base is formed with the stack rib for preventing itself, especially its signal area from being damaged due to the contact of stacked disc bases especially when they are stacked just after molded. This stack rib is formed into an annular ridge and so positioned on the side of the disc base, in which no signal is to be recorded, and around the clamp area that it may not fall in the annular groove formed in the opposite face by the stamper holder.

FIG. 6 is a section showing one example of the so-called "compact disc (as will be shortly referred to as the "CD")", which is formed with a stack rib 100 of the prior art. This stack rib 100 is so formed inside of an annular groove 3, which is formed during the molding by the stamper holder, that it may not fall in the annular groove 3. The stack rib 100 is integrally formed with: a top 101 having a height of about 0.22 mm and a flat portion width W1 of about 0.3 mm; a sloped portion 102 leading to a clamp area 6 inside of the top 101; and a sloped portion 103 leading to a signal area 5 outside of the top 101. These sloped portions 102 and 103 have substantially equal angles of slope.

In the mold for forming the aforementioned stack rib, however, the cavity to be formed by clamping the stationary half and the movable half is eaten away by a stamper holder for fixing the stamper and is formed with an annular groove for forming the stack rib. If, therefore, the injection rate is increased, the air is stagnated at the stepped portion of the stamper holder to cause a cold mark. Thus, there arises a problem that the cold mark deteriorates the transferring properties or the double refractive index or that the cold mark extends as far as the signal area so that the disc base cannot be used in its entirety.

In order to prevent the aforementioned cold mark, on the other hand, it is conceivable to lower the injection rate. At the lower injection rate, each cycle takes the longer time to raise a problem that the production efficiency is accordingly lowered.

FIG. 7 is a top plan view showing the cold mark CM which is formed when the disc formed with the stack rib 100 shown in FIG. 6 is molded. This cold mark was formed for a resin charging time of less than 0.60 seconds. In order to eliminate this cold mark, the resin charging time had to be set to 0.70 seconds or longer.

In case, moreover, the molded disc bases are to be stacked, the disc base, which has not been cooled down completely, may have its stack rib stuck on another. When the disc base is to be transferred by means of a suction pad, there arises another problem of the so-called "double suction", in which another disc base sticks to that which is to be transferred, so that two or more disc bases are simultaneously taken out.

In order to solve these problems, the prior art has provided the following counter-measures.

First of all, here will be described one example of the stack rib of the prior art for solving the aforementioned problems. According to this example, the top 111 of a stack rib 110 is made narrower, as shown in FIG. 8, than the top 101 of the stack rib 100 of the prior art to eliminate the flat portion, so that no two disc bases may not be stuck on each other and moved together when they are to be moved one by one by the suction pad or the like from the stack of the molded disc bases.

According to this example, the vertical stick can be eliminated, but the cold marks are liable to occur double or triply, as shown in FIG. 9, and the silver blister is also liable to occur. In order to mold the disc bases stably, therefore, the resin charging time cannot be made shorter than 0.80 seconds.

Here will be described another example of improving the stack rib of the prior art. According to this example, as shown in FIG. 10, the flat top of a stack rib 120 is given such a width of about 1.1 mm as is larger than that of the flat portion of the top 101 of the stack lib 100 of the prior art.

According to this example, however, the cold mark CM formed has a large shape independently of the charging time, as shown in FIG. 11. As a result, the disc base having the stack rib 120 of this example cannot be used in the least.

The present invention has been conceived in view of the problems described above and has an object to provide a disc with a stack rib, which has an excellent production efficiency and an excellent double refractive index.

Another object of the present invention is to provide a mold for molding a disc with a stack rib, which is not required to lower a resin injection rate but freed from any cold mark.

SUMMARY OF THE INVENTION

In order to solve the above-specified problems, a disc base according to the present invention is characterized: in that it is formed by an injection molding with an opening at its center, a signal area having signals transferred thereto by a stamper on at least one of its faces, and a stack rib formed between the outer circumferential edge of the disc base and said opening; and in that said stack rib is formed such that the angle of a sloped portion at the center opening side of the disc base is smaller than the angle of a sloped portion at the outer circumferential edge side of the base.

In order to achieve the above-specified objects, moreover, a disc base molding mold according to the present invention comprises: a stationary half; a movable half opposed to said stationary half; a stamper fitted in said movable half; and an annular groove formed in said stationary half for forming a stack rib, and is characterized in that said annular groove is formed such that the angle of slope from the edge portion at the upstream side of a resin flow to the deepest bottom is smaller than the angle of slope from the edge portion at the downstream of the resin flow to the deepest bottom.

A heated molten resin material is injected into the center of a cavity of the clamped mold through a sprue bush of the mold. The resin thus injected into the cavity radially extends while discharging the air from the cavity, and the resin flow is curved by the flanged portion of the stamper holder. However, the resin flows along the gentle slope of the stack rib forming groove corresponding to the abrupt rise of said flanged portion and is then guided toward the stamper along the steep slope from the deepest bottom of the groove so that the resin can smoothly flow in the cavity.

The molten resin downstream of the steeply curved flanged portion is pushed by the steep slope of the stack rib forming groove so that the air is not stagnated but smoothly expelled from the cavity even if the injection rate is increased. As a result, it is possible to prevent the cold mark from being formed even at a high injection rate.

BRIEF DESCRIPTION OF THE DRAWINGS

FIG. 1b is a section taken along line I—I of FIG. 1a;

PREFERRED EMBODIMENT OF INVENTION

The stack rib of the prior art described above has been investigated to provide a stack rib according to the present invention. Here will be described with reference to the accompanying drawings the case in which one embodiment of the disc base according to the present invention is applied to a CD.

Figure 1A:
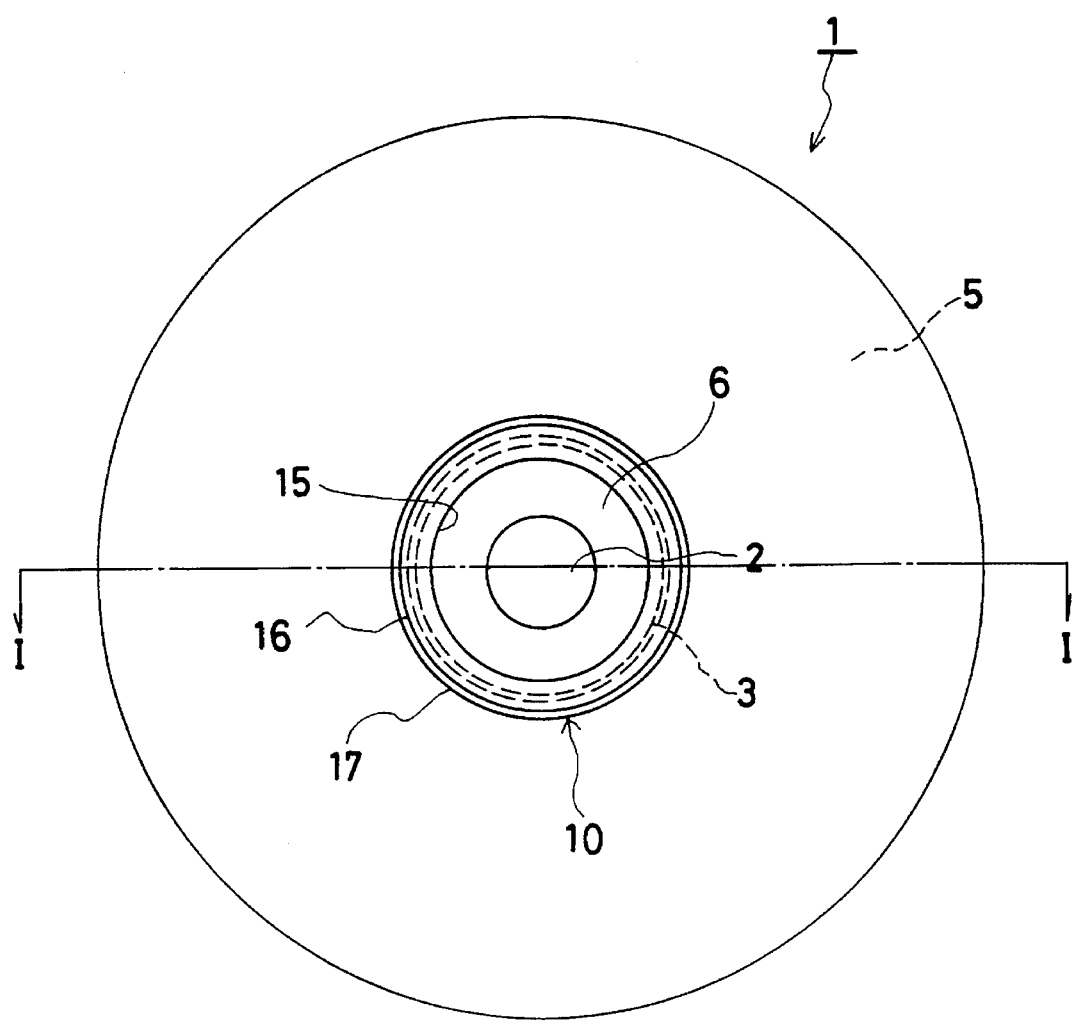
FIG. 1a is a front elevation of a disc base according to the present invention.
Figure 1B:
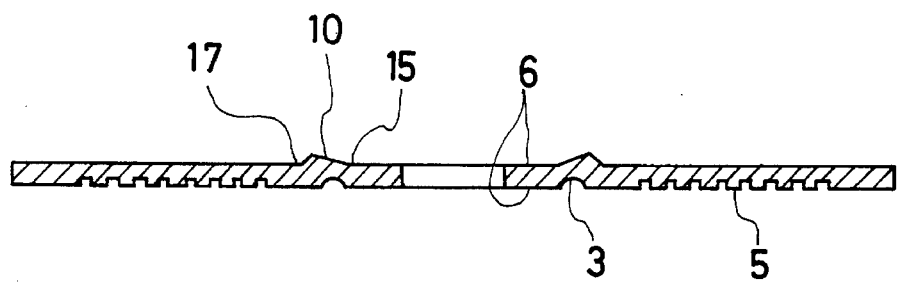

FIG. 1a is a top plan view of a disc base 1 according to the present Invention, and FIG. 1b is a section taken along line I—I of FIG. 1a. The disc is formed at its center with a circular opening 2, which is surrounded by an annular groove 3. This annular groove 3 is formed in the back of the disc, as shown, by a stamper holder. Pits (although not shown) are transferred to and formed in a helical or concentric shape between the annular groove 3 and the outer circumferential edge by the stamper. This area, to which is transferred the stamper, is formed with the reflective layer and the protecting layer (although both are not shown, and the side opposed to that area, i.e., the side shown in FIG. 1 provides a signal area 5. Moreover, the surface and back of the circumferential edge of the disc around the center opening 2 provides clamp areas 6, at which is fixed the disc by the rotating drive shaft of a CD player.

Figure 2:
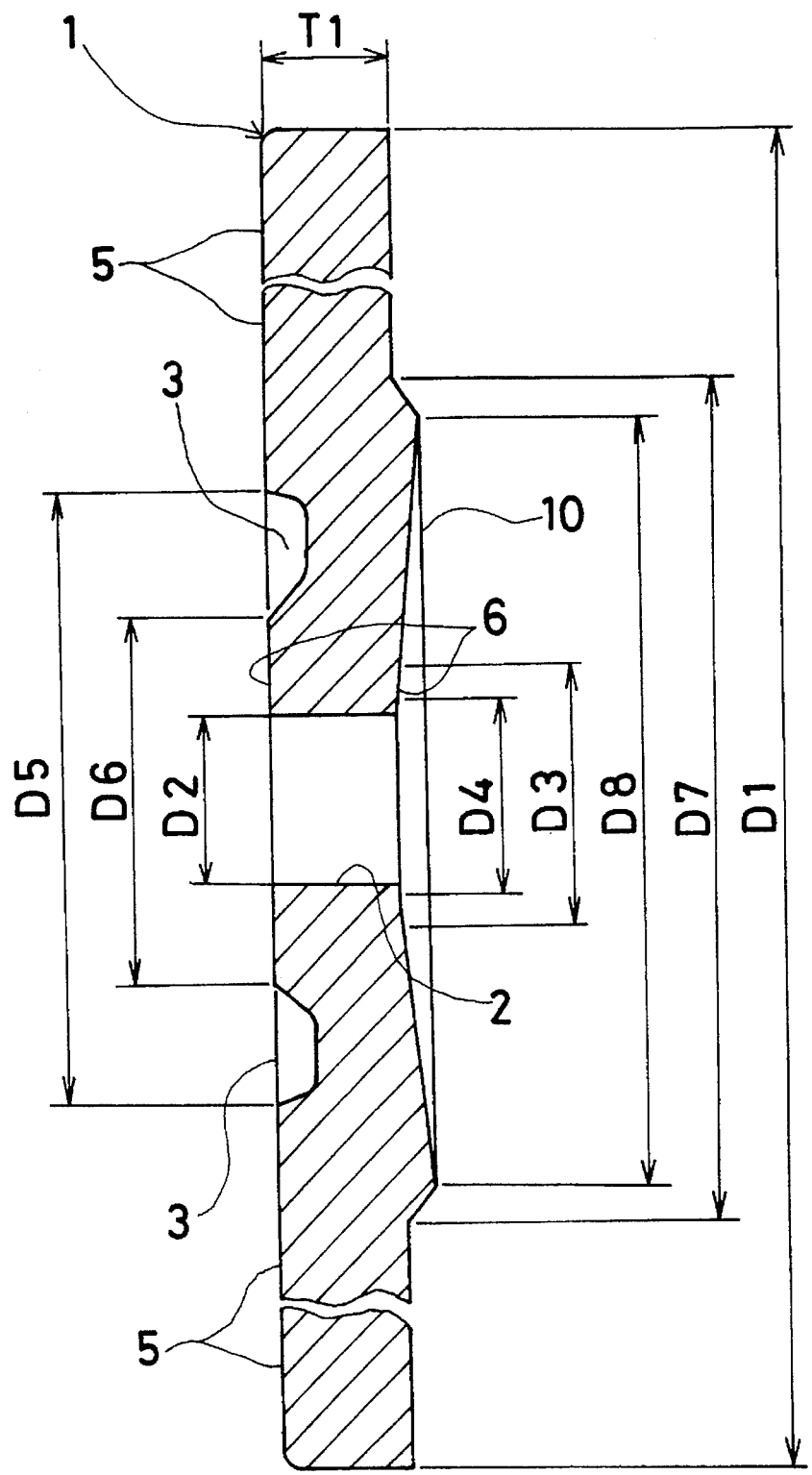
FIG. 2 is an enlarged section of a central portion of the disc base according to the present invention.

The stack rib is formed on the back of the signal face in the range between the clamp area and the signal area. Specifically, the stack rib is formed into an annular ridge and positioned such that its top will not fall in the annular groove 3 when two discs are concentrically stacked. In this embodiment: the disc has a diameter D1 of 120 mm and a thickness T1 of 1.2 mm; the center opening has a diameter D2 of 15 mm; the clamp area has a diameter (D3-D4) of 26 to 33 mm; the signal area has a diameter (D1-D7) of 46 to 116 mm; and the annular groove formed in the back by the stamper holder has a diameter (D5-D6) of 35.9 to 38 mm. The stack rib 10 is formed on the side opposed to the signal face in the range of a diameter (D7-D3) of 33 to 40 mm between the clamp area 6 and the signal area 5 (as shown in FIG. 2). Moreover, the stack rib 10 has a height T2 of 0.1 to 0.4 mm, desirably 0.22 mm (as shown in FIG. 3).

Figure 3:
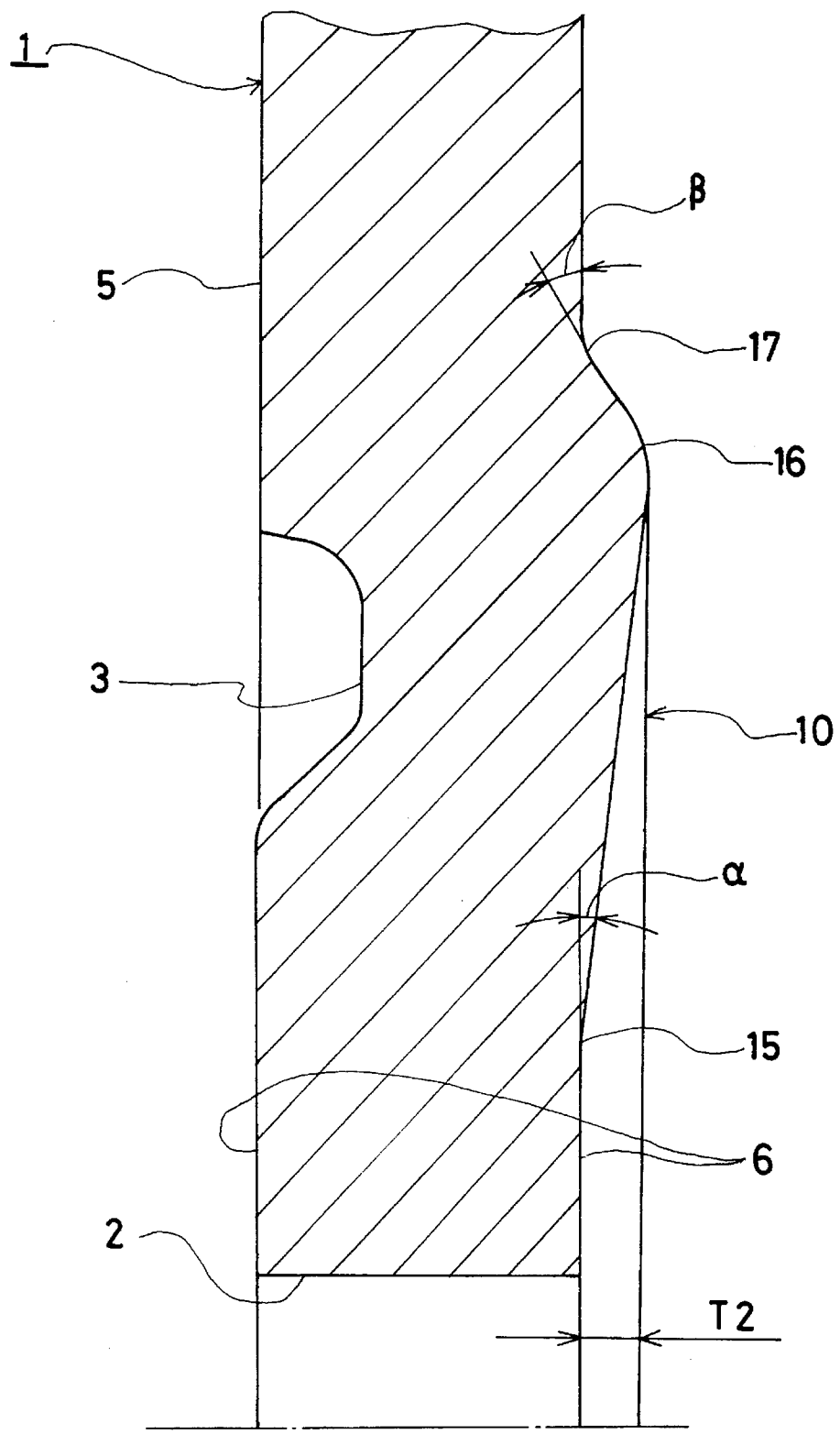
FIG. 3 is an enlarged section of a portion of the disc base formed with a stack rib according to the present invention.

The stack rib 10 is shaped, as shown in FIG. 3, such that the angle a of slope from a rising portion 15 at the center opening 2 of the disc base 1 to a top 16 is smaller than the angle β of slope from a rising portion 17 at the outer circumferential side of the disc base 1 to the top 16, and is positioned with such an offset that the top 16 may not fall in the annular groove 3 formed by the stamper holder. In this embodiment, the top 16 is positioned to have a diameter D8 of 38.55 mm, and the angle a of slope from the center side rising portion 15 to the top is set to 5 degrees whereas the angle β of slope from the outer circumferential side rising portion 17 to the top 16 is set to 30 degrees, so that the rising portion 15, the top 16 and the rising portion 17 smoothly merge while forming no flat face on the top 16.

Figure 4:
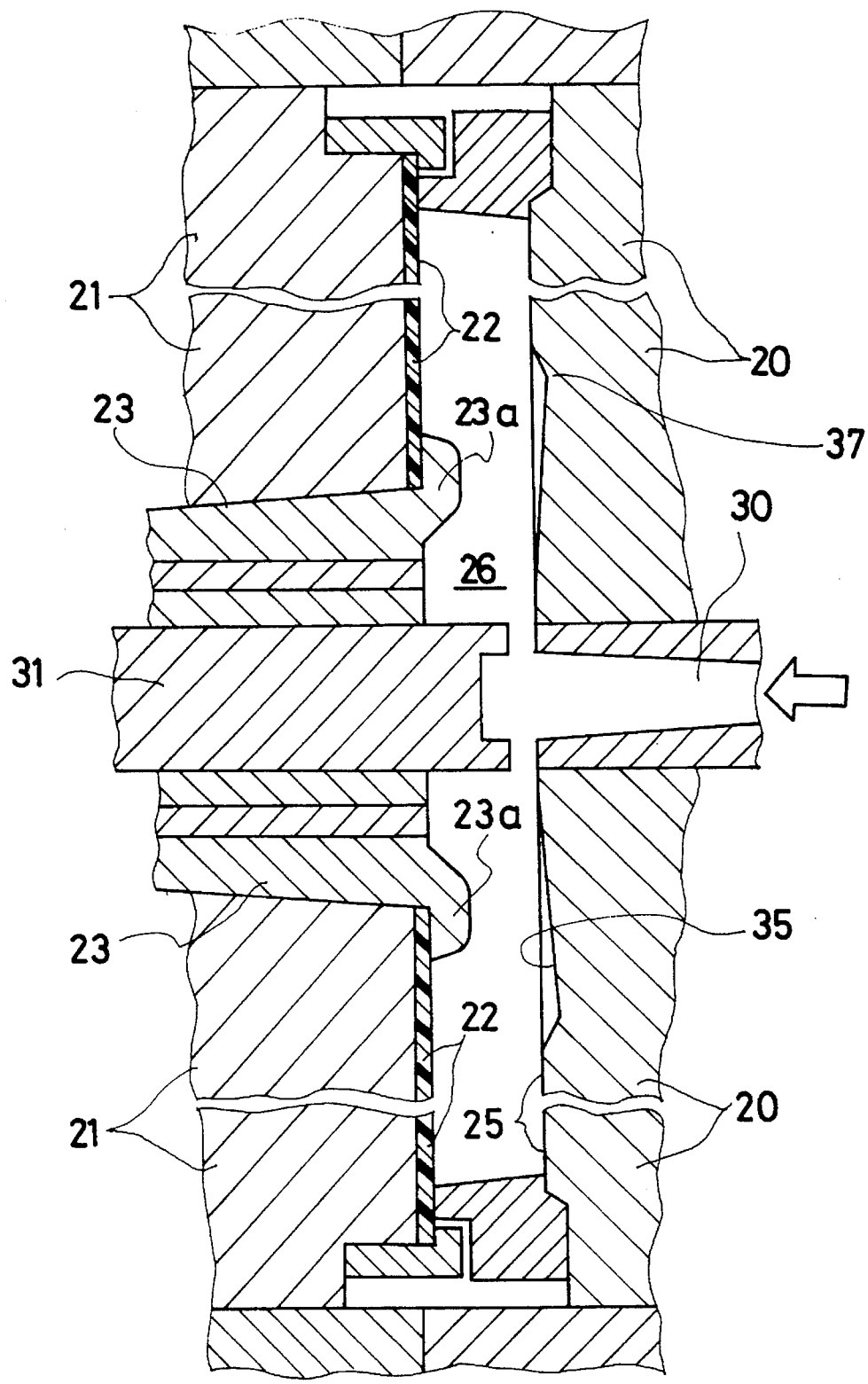
FIG. 4 is a section showing a mold for injection-molding the disc base according to the present invention.
Figure 5:
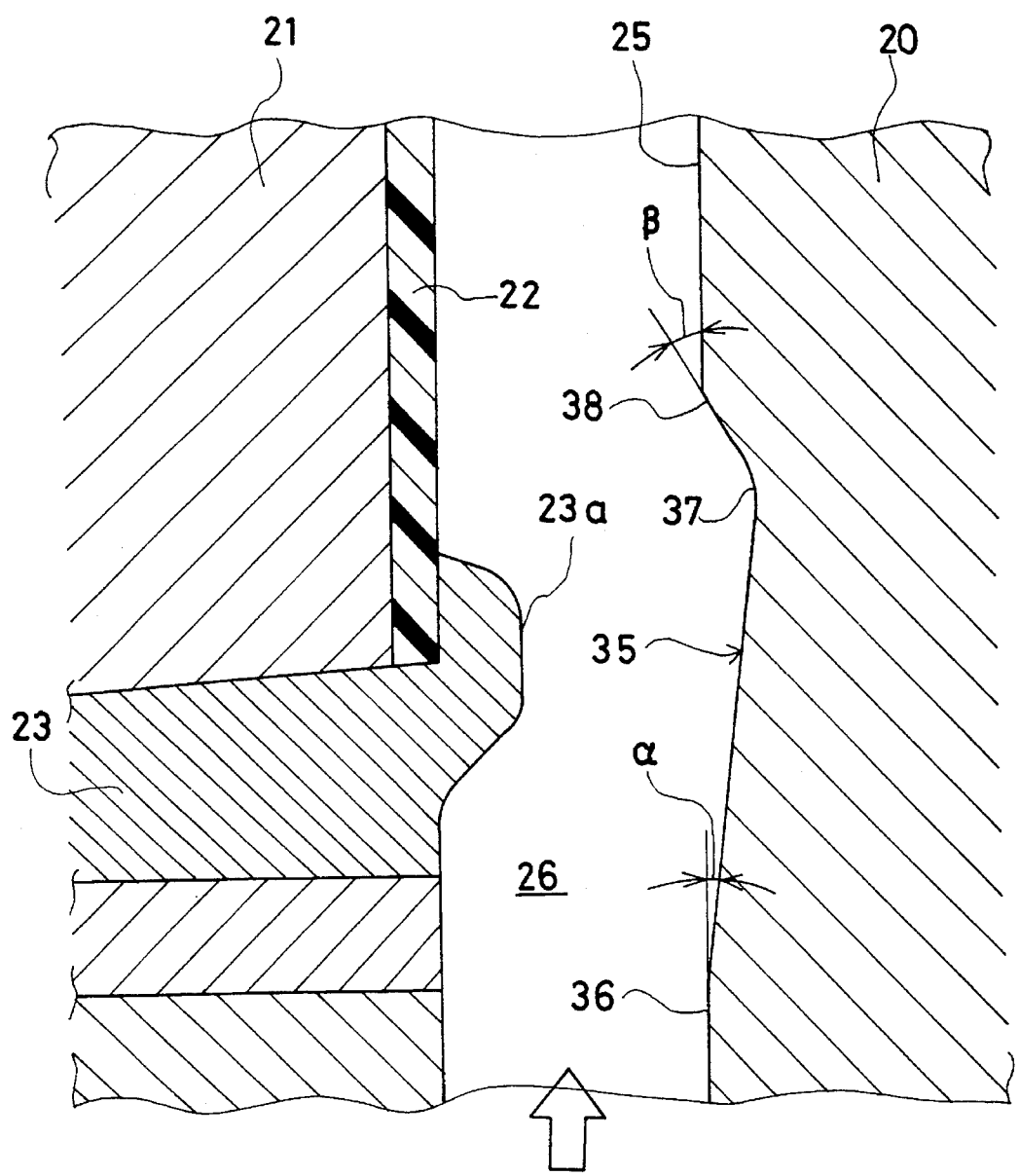
FIG. 5 is an enlarged section of a portion of the disc base injecting-molding mold according to the present invention.
Figure 6:
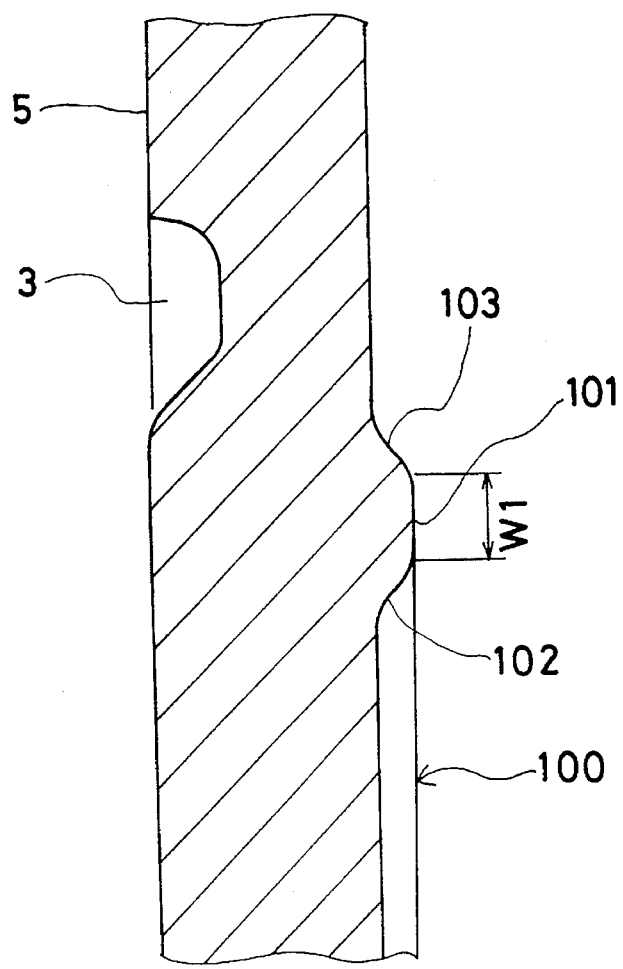
FIG. 6 is an enlarged section showing a portion of the disc base formed with the stack rib of the prior art.
Figure 7:
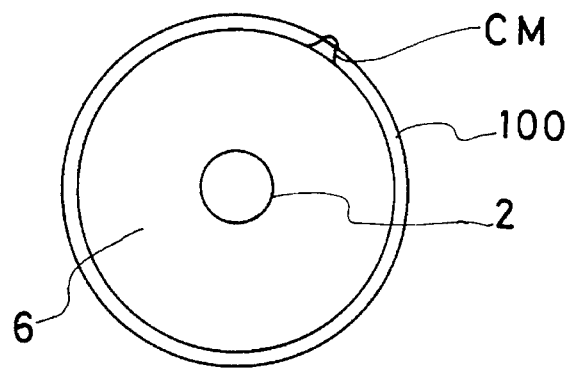
FIG. 7 is a conceptional diagram showing the cold mark which is formed when the disc base formed with the stack rib, as shown in FIG. 6, is molded.
Figure 8:
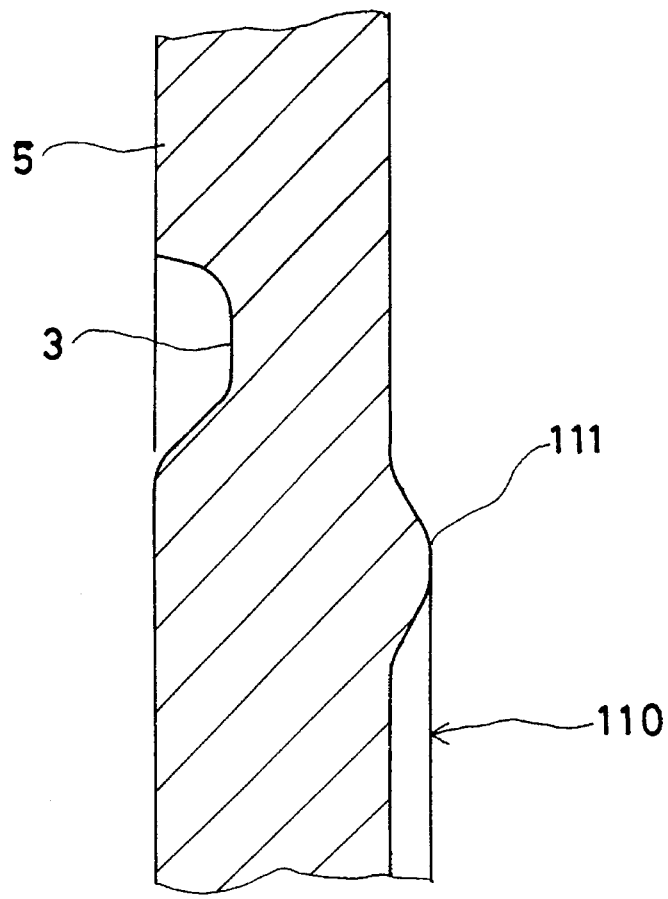
FIG. 8 is an enlarged section of a portion of the disc base and shows a modification of the stack rib of the prior art.
Figure 9:
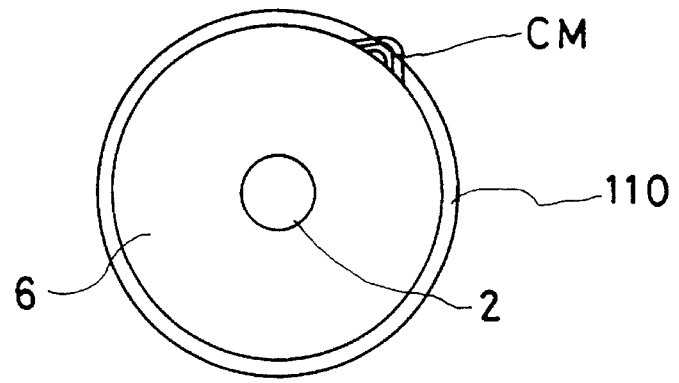
FIG. 9 is a conceptional diagram showing the cold mark which is formed when the disc base formed with the stack rib, as shown in FIG. 8, is molded.
Figure 10:
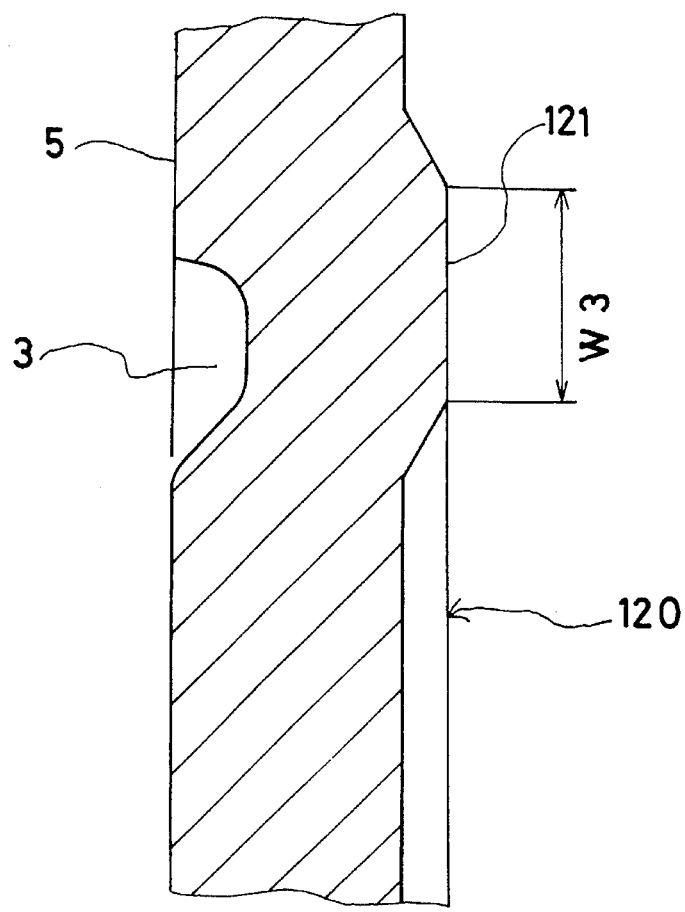
FIG. 10 is an enlarged section of a portion of the disc base and shows another modification of the stack rib of the prior art.
Figure 11:
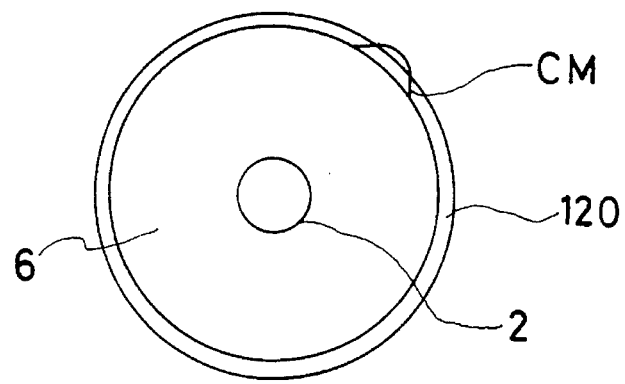
FIG. 11 is a conceptional diagram showing the cold mark which is formed when the disc base formed with the stack rib, as shown in FIG. 10, is molded.

Here will be described a disc molding mold according to the present invention. This disc molding mold according to the present invention is generally constructed, as shown in FIG. 4, to include: a stationary half 20 mounted on the (not-shown) stationary platen; a movable half 21 mounted on the (not-shown) movable platen; and a stamper 22 fitted in the movable half 21 by a stamper holder 23.

The stationary half 20 and the movable half 21 are clamped in face-to-face relation to form a cavity 26 inbetween. This cavity 26 is charged with a heated molten resin which is injected from a sprue 30 leading to the (not-shown) nozzle at the leading end of the heating cylinder and positioned at the central portion of the cavity, to mold a disc.

Into the center of the movable half 21, there is movably inserted a punch 31 for forming the opening 2 in the disc base 1. Around the punch 31, there is fitted the stamper holder 23 which has a flanged portion 23a for fitting the stamper 22 in the movable half 21. Since the stamper 22 is fitted between the movable half 21 and the flanged portion 23a, the stamper holder 23 has its flanged portion 23a protruded into the cavity 26.

The stationary half 20 is formed around the sprue 30 at its center with an annular groove 35 for forming the stack rib 10. The deepest bottom 37 of the annular groove 35 is positioned such that it is not diametrically coincident with the flanged portion 23a of the opposed stamper holder of the movable half 21. Moreover, the angle α of slope from the edge portion 36 of the groove at the sprue bush side to the deepest bottom 37 is set smaller than the angle β of slope from the edge portion 38 of the groove at the outer circumferential side of the disc to the deepest bottom 37.

Here will be described the operations of the mold having the construction described above. The stationary half 20 and the movable half 21 are clamped, and the molten resin is injected into the cavity 26 through the sprue bush 30. The resin radially flows while discharging the air from the cavity 26, and its flow will be made stagnant by the flanged portion 23a of the stamper holder, especially by the abrupt curve downstream of the flanged portion 23a. However, the stagnation can be eliminated because the flow is smoothly guided toward the stamper 22 by the steep slope of the stack rib forming groove 35 from the deepest bottom 37. Moreover, the resin flows so smoothly from the flanged portion to the outer circumference along the mirror surface 25 of the stationary half 20 and the surface of the stamper 22 of the movable half 21 so that it will not entrain the air. As a result, no cold mark is established even at a high injection rate. As a matter of fact, no cold mark was found for a charging cycle of 0.21 seconds in the disc base which was molded by using the mold structure described above.

Incidentally, it is quite natural in the foregoing embodiment that the stationary half and the movable half can be replaced by each other. Specifically, the stationary half may be formed with the stamper 22 and the stamper holder 23 whereas the movable half may be formed with the groove for the stack rib.

Thanks to the construction thus far described, the present invention can achieve the following effects.

The disc base according to the present invention is freed from not only any cold mark to have an excellent double refraction but also any defect to avoid waste, because the air can be smoothly released in the molding process to allow the molten resin to flow into every corners of the cavity.

Moreover, the mold to be used for molding the disc base according to the present invention can take a shortened time period for charging it with the resin, because it establishes no cold mark even at an increased injection rate.

In case, still moreover, the disc base is molded by using the aforementioned mold, it will not contact with another even if a plurality of molded disc bases are stacked, because the top of the stack rib formed on the disc base is not wide. As a result, the handling of the molded disc bases is easy because it is not postponed till the disc bases are completely cooled down to set.

According to the present invention, therefore, it is possible to manufacture disc bases of high quality efficiently.

What is claimed is:

1. A disc base having two faces, a center opening, an outer circumferential edge concentric with said center opening, clamp areas located on said two faces and positioned between said center opening and said outer circumferential edge, said clamp areas being concentric with said center opening, a stamper holder groove adjacent said clamp area on one face, said stamp holder groove being concentric with said center opening, a signal area on said one face adjacent said stamper holder groove extending towards said outer circumferential edge, said signal area being concentric with said center opening, a stack rib located on a face opposite said one face, said stack rib being positioned between said center opening and said outer circumferential edge, wherein said stack rib is concentric with said center opening, wherein the improvement comprising:

said stack rib having an inner slope with an angle and an outer slope with an angle, wherein said outer slope angle is greater than said inner slope angle, said slopes rising angularly to merge at a top without forming any flat face.

2. The disc base according to claim 1, wherein a top of said stack rib has a diameter and the stamper holder groove has a diameter, wherein said stack rib diameter is greater than said stamper holder groove diameter.

3. The disc base according to claim 1, wherein said inner slope has a length and said outer slope has a length, wherein said inner slope length is greater than said outer slope length.

4. The disc base according to claim 1, wherein said stamper holder groove on said one face is positioned opposite said inner slope of said stack rib on said opposite face.

* * * * *